United States Patent [19]

Adler

[11] 4,073,239
[45] Feb. 14, 1978

[54] CLOSING MEANS FOR A HATCH COVER

[75] Inventor: Franklin P. Adler, Michigan City, Ind.

[73] Assignee: Apex Railway Products Co., Chicago, Ill.

[21] Appl. No.: 724,644

[22] Filed: Sept. 20, 1976

[51] Int. Cl.² ................... B61D 39/00; B65D 45/28
[52] U.S. Cl. .................................. 105/377; 114/203; 292/260
[58] Field of Search ........... 114/116, 117, 177, 201 R, 114/201 A, 203; 292/246, 248, 249, 250, 259, 260; 105/377

[56] References Cited

U.S. PATENT DOCUMENTS

| 553,344 | 2/1896 | McCormick et al. | 292/250 |
| 1,432,591 | 10/1922 | Carll | 292/259 |
| 1,956,665 | 5/1934 | Cahall | 292/260 |
| 1,973,228 | 9/1934 | Schott | 292/260 |
| 2,659,514 | 11/1953 | Henderson | 292/260 |
| 3,145,039 | 8/1964 | Richter | 114/203 |
| 3,266,440 | 8/1966 | Price et al. | 105/377 |
| 4,044,918 | 8/1977 | Alton | 292/260 |

Primary Examiner—Drayton E. Hoffman
Assistant Examiner—Carl Rowold
Attorney, Agent, or Firm—James J. Conlon

[57] ABSTRACT

A hatch cover having a locking mechanism comprising a single hand wheel with a shaft threaded to the cover for limited up and down movement as the hand wheel is turned. A locking strap is hinged on one side of the hatch cover, releasably locked on the other side and has an opening through which the shaft extends. The locking strap is confined between the hand wheel and a thrust washer attached to the shaft in such a fashion that rotation of the hand wheel in one direction produces contact between the locking strap and thrust washer to force the cover downwardly. Rotation in the other direction lifts the hatch cover to permit unlatching of the locking strap and access to the hopper.

8 Claims, 4 Drawing Figures

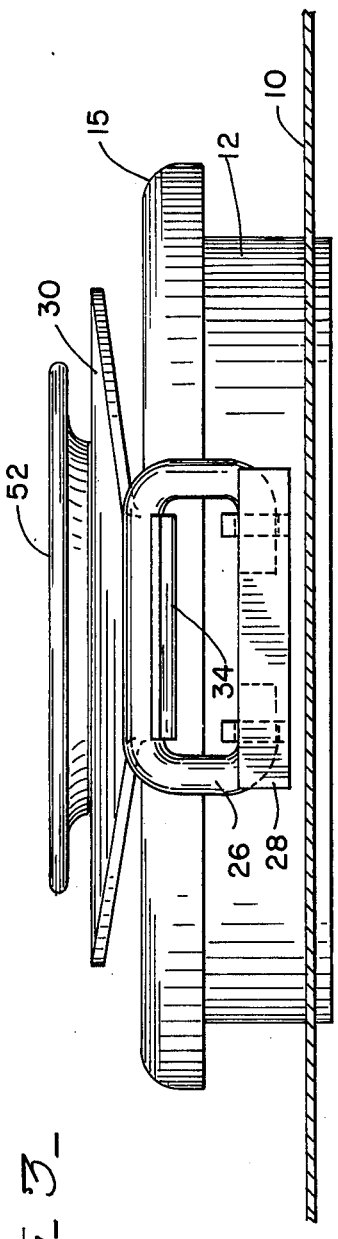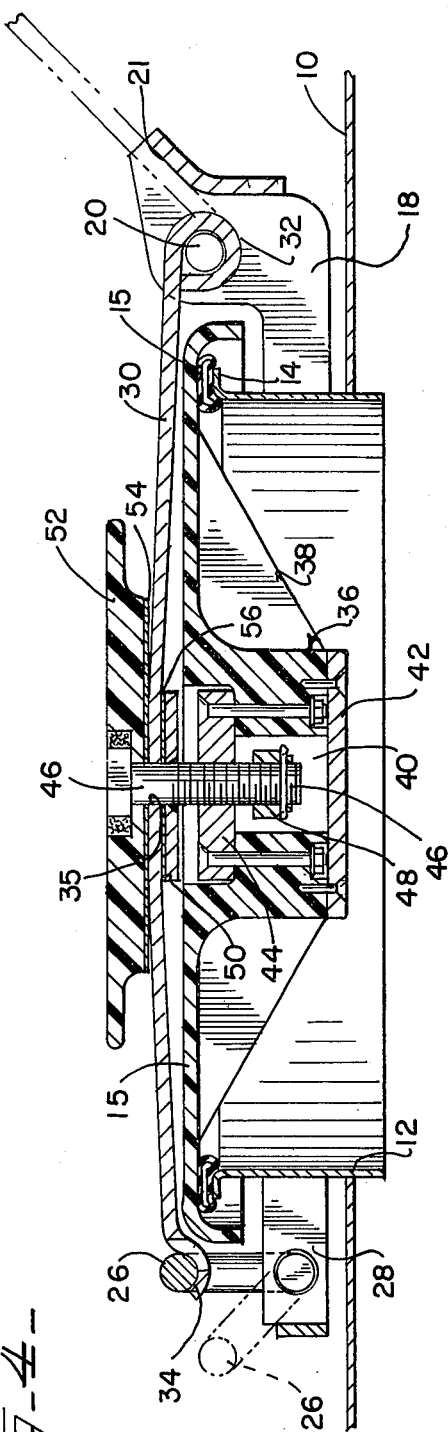

CLOSING MEANS FOR A HATCH COVER

BACKGROUND OF THE INVENTION

1. Field of the Invention

This invention pertains to hatch covers in general and in particular to hatch covers used on railway hopper cars.

2. Description of the Prior Art

Prior art hatch covers having rotatable hand wheels hve generally involved mounting pivoting threaded eye-bolts and three small hand wheels about a hatch cover and tightening each wheel after its eye-bolt is placed in a U-shaped slot of the hatch cover. Another type of hatch cover device, such as that disclosed in Carney U.S. Pat. No. 3,155,052 (1964), uses a single hand wheel in combination with both a threaded shaft and arms that permit the cover to be moved vertically and then swung aside to provide access for the hopper.

These types of hatch cover locking devices have met with limited use but there has been no widespread acceptance because the multiple hand wheel arrangement requires excessive time to open or close a hatch cover, and, the hand wheel/arm arrangement can result in inadequate sealing and is undesirable for certain applications because the locking mechanism is exposed to the material within the hopper which could result in contamination.

SUMMARY

This invention pertains to a hatch cover and a locking mechanism that provides secure locking and sealing of a hopper with a minimum of time and effort and wherein the locking mechanism is not exposed to the interior of the hopper to prevent contamination or retention of lading and eliminates the need for fabricating the mechanism from more expensive, non-corrosive, stainless steel.

In operation, the hatch cover is pivoted to a closed position atop the hatch coaming and a retainer loop is secured about a free end of a hinged locking strap. A single hand wheel has a shaft fitted through the locking strap and is threaded (left hand) to the hatch cover. However, the hand wheel and shaft are attached to the locking strap with a thrust washer in such a fashion to permit rotation of the hand wheel and shaft but fix the position of the strap relative the hatch cover. Consequently, clockwise rotation of the hand wheel forces the hatch cover away from the locking strap thus causing the hatch cover to move downwardly to compress the hatch cover gasket and form a secure seal.

One of the purposes of this invention is to provide a secure hatch cover locking mechanism that may be easily operated by one person to quickly open and close a hatch cover as required.

These and other objects, purposes and advantages of the invention will become apparent to those having ordinary skill in the art with reference to the drawings, description and claims.

BRIEF DESCRIPTION OF THE DRAWINGS

FIG. 3 is a side view of the hatch cover; and,

FIG. 4 is a sectional view taken generally along lines 4—4 of FIG. 2.

DETAILED DESCRIPTION

Figure 1:
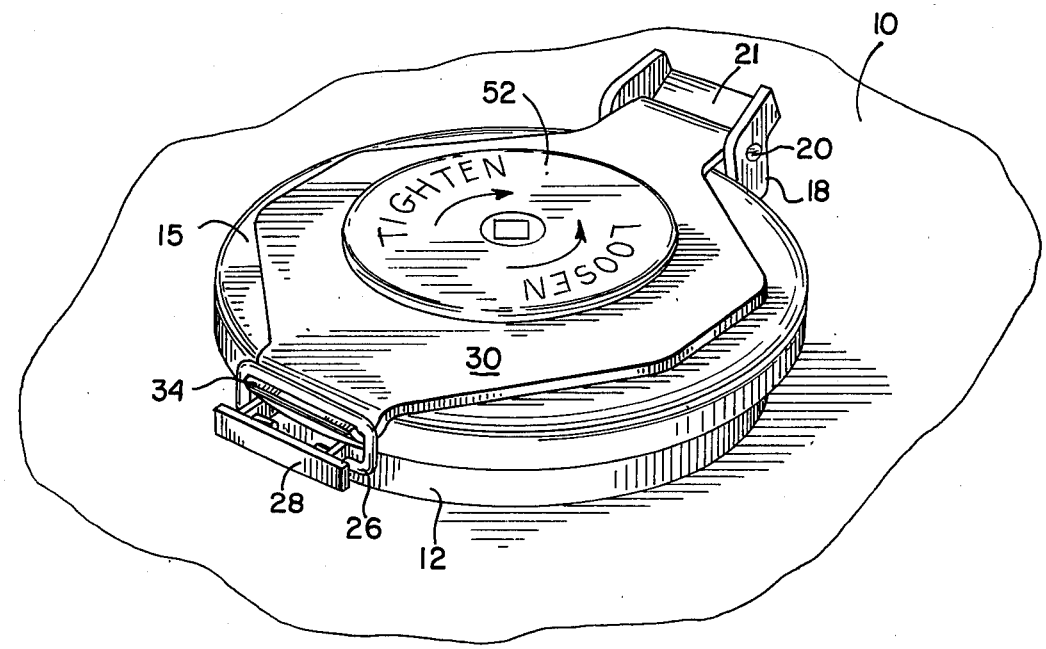
FIG. 1 is a pictorial illustration of a hatch cover utilizing the locking mechanism disclosed herein.
Figure 2:
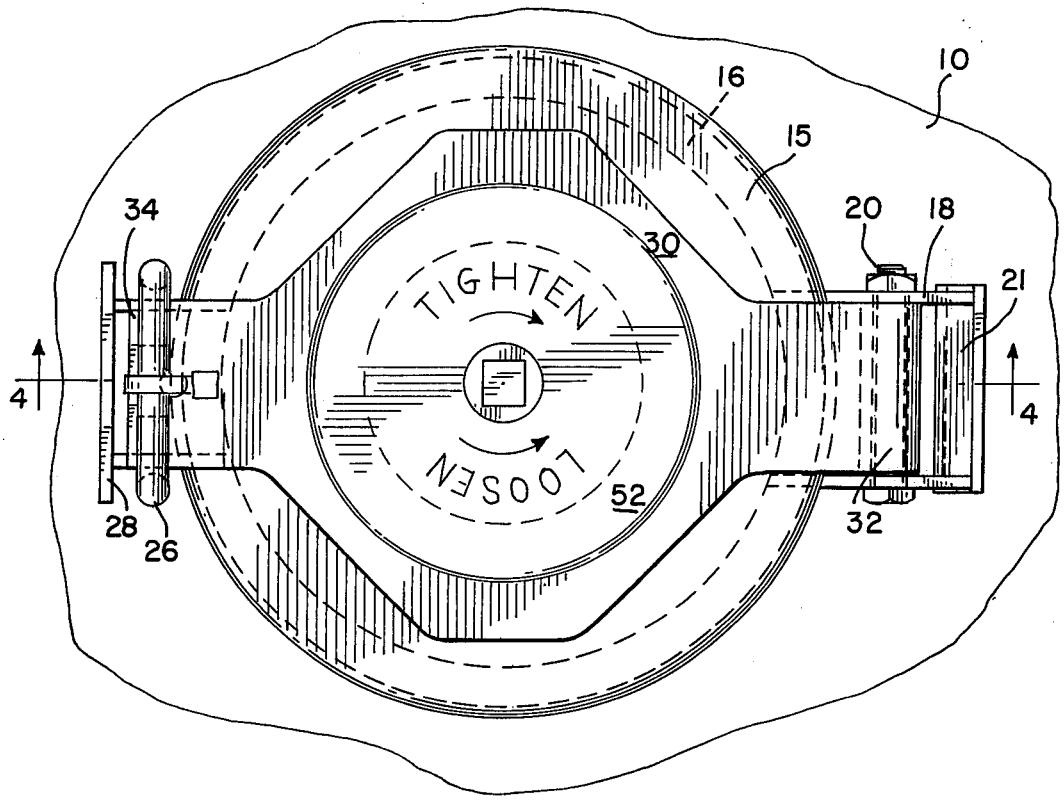
FIG. 2 is a top plan view of the hatch cover arrangement illustrated in FIG. 1.

FIG. 1 discloses a typical hatch sealing and closing arrangement showing the top portion of a hopper 10. The hopper 10 has the usual coaming 12 attached and extending upwardly therefrom. As shown in FIG. 4, the coaming 12 may have a top flange 14 for seating of a deformable sealing gasket 16 attached to the underside of cover 15. Hatch cover 15 is sized to overlap the coaming 12 to provide run off of rain water and other moisture away from the seal interface of cover 15 and coaming 12. Hatch cover 15 is attached to a locking strap 30 and moves upwardly as the locking strap 30 is pivoted upwardly.

Hinge bracket 18 is attached to one side of the coaming 12 and includes a hinge bolt 20. Shoulder 21 of hinge bracket 18 allows the hatch cover 15 to rest in an open position above the hopper top 10 to prevent chipping or otherwise marring the painted surface that could occur if the cover 15 rested on top of the hopper. Retainer loop 26 is attached to the other side of the coaming 12 and pivots in its associated bracket 28 for locking and unlocking the hatch cover 15.

As shown in FIG. 1, extending across the top of the cover 15 is a locking strap 30. Strap 30 includes a first overlapping end portion 32 that is attached about the hinge bolt 20 and a second extended end spaced across hatch cover 15. The extended end of the strap 30 includes locking lip 34 that is contoured to receive the retainer loop 26 for locking purposes. The central portion of the locking strap 30 has an opening 35.

As shown in FIG. 4, the hatch cover 15 may be a one-piece cast of forged aluminum, plastic, steel or the like with central hub 36 and having a number of tapered reinforcing arms 38 extending outwardly therefrom. The hub 36 includes a central chamber 40 closed off at one end with cover piece 42 and at the other end with the threaded plate 44. Cover piece 42 and plate 44 are securely attached to the hub 36 with suitable fasteners.

A shaft 46 that has a left hand thread is fed through opening 35 in locking strap 30 and into the threaded plate 44. Nut 48 is attached to one end to prevent removal. It is suggested that the shaft 46 have a left hand thread to cause locking of the hatch cover as the hand wheel is turned clockwise. Thrust washer 50 is attached to shaft 46 and positioned on the underside of strap 30. The top end of shaft 46 is suitably attached to a hand wheel 52 to allow shaft 46 to move in unison with hand wheel 52. Suitably sized washers 54, 56, made of brass or other compatible material, are positioned about the locking strap 30 to prevent galling when the shaft 46 is rotated and axial forces are produced.

In operation, the hatch cover 15, with gasket 16 attached, is initially positioned atop the flange 14 of coaming 12 followed by insertion of the retainer loop 26 over the locking lip 34 of strap 30. Next, hand wheel 52 is turned in a clockwise direction and hatch cover 15 tends to move downwardly with respect to the locking strap 30. As shaft 46 is rotated clockwise, thrust washer 50 urges the underside of locking strap 30 in an upward direction (see FIG. 4). However, the locking strap 30 and hatch cover 15 are prevented from moving upwardly because both are firmly locked in position by the hinge pivot pin 24 and the retainer loop 26. Thus, the net result of rotating hand wheel 52 is to force the hatch cover 15 downwardly. As the hatch cover is forced downwardly, sealing gasket 16 will be deformed, as shown in FIG. 4, to provide a completely sealed hatch opening.

All the mechanism components associated with the hatch cover 15, namely, locking strap 30, threaded shaft 46 and thrust washer 50, are not exposed to the hopper interior and therefore can be made from relatively inexpensive metals. Also, because the underside of cover 15 is continuous and contains no moving parts, there is no risk of contamination of the lading or retention of lading.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. Cover means for a hatch opening comprising:
   a hatch cover;
   hinge means providing for pivotal opening and closing movement of said hatch cover;
   a locking strap having lip means overlapping and extending beyond the hatch cover and said locking strap having means attached to said hinge means;
   retainer means for attachment to the lip means of said strap for securing the strap in a locked position;
   a rotatable hand wheel;
   a threaded shaft with means attached to said hand wheel for rotation of said shaft;
   said locking strap having a top, an underside, and an opening for passage of said shaft;
   said hatch cover having a hub with a chamber therein;
   said chamber including closed sides, a closed lower end formed by a removable end cover piece and a threaded open upper end formed by an internally threaded means;
   said hub having a shoulder;
   said internally threaded means having means mounted upon said shoulder for securely holding the internally threaded means within said chamber;
   means attaching the internally threaded means to said shoulder;
   said shaft having threaded means extending through the internally threaded means for movement of the shaft into and from the chamber when the shaft is rotated;
   said rotatable hand wheel having means adjacent the top side of said locking strap and engageable therewith for urging the locking strap downwardly;
   thrust means attached to said shaft adjacent the underside of said locking strap and opposite the hand wheel for urging the locking strap upwardly; and,
   said thrust means and said internally threaded means being spaced apart a first distance when in the locked position and said first distance increasing to a greater distance upon rotation of the hand wheel in one direction whereby the thrust means engages the underside of the locking strap forcing apart the internally threaded means and thrust means to urge the hatch cover down to close off said hatch opening.

2. The cover means of claim 1 wherein the hinge means includes:
   means cooperative with said locking strap and having inclined stop means to position the cover means at an angle to the hatch opening.

3. The cover means of claim 1, wherein the retainer means includes:
   bracket means;
   a retainer loop with means mounted for pivotal movement within the bracket means; and,
   said lip means of the locking strap having a contoured section adapted to receive the retainer loop for securing the hatch cover upon the hatch opening.

4. The cover means of claim 1 wherein said chamber includes:
   the end cover piece for providing said closed end; and,
   means for removably securing the end cover piece to said hub.

5. The cover means of claim 4 wherein said chamber includes:
   a first open portion and a connected second open portion concentric therewith;
   said first open portion forming said shoulder for the internally threaded means;
   said means mounted upon said shoulder for holding the internally threaded means includes fastener means extending to the closed end of said chamber; and,
   said fastener means extending to the closed end of said chamber including means accessible for removal of the internally threaded means when the end cover piece is removed from the closed end of the hub.

6. The cover means of claim 1 and:
   friction reducing washer means surrounding said shaft adjacent the locking strap.

7. The cover means of claim 1 wherein said threaded shaft includes:
   a left hand thread whereby rotation of the hand wheel in a clockwise direction secures the hatch cover on the hatch opening.

8. The cover means of claim 1 wherein said hatch cover includes:
   reinforcing arm means;
   said reinforcing arm means including first rib means attached to said hub, and second rib means attached to the hatch cover and said first and second rib means extending outwardly from said hub to strengthen the hatch cover.

* * * * *